// United States Patent [15] 3,656,062
Wlasuk [45] Apr. 11, 1972

[54] LIGHTNING PROTECTION SYSTEM

[72] Inventor: Steven Wlasuk, Blackwood, N.J.
[73] Assignee: RCA Corporation

[22] Filed: Mar. 26, 1969
[21] Appl. No.: 810,606

[52] U.S. Cl. ....325/362, 325/380
[51] Int. Cl. ....H04b 1/06
[58] Field of Search ....325/362, 380; 317/20; 328/8; 323/81, 89; 321/25

[56] References Cited

UNITED STATES PATENTS

| | | | |
|---|---|---|---|
| 1,537,975 | 5/1925 | Vreeland | 325/380 |
| 2,097,272 | 10/1937 | Drake | 325/362 |
| 3,126,514 | 3/1964 | Germain et al. | 325/362 |
| 2,836,788 | 5/1958 | Camilli et al | 323/44 |
| 3,221,234 | 11/1965 | Ault | 323/81 |
| 3,263,158 | 7/1966 | Bargen et al. | 317/20 |
| 3,133,251 | 5/1964 | Hays et al. | 325/362 |

*Primary Examiner*—Richard Murray
*Attorney*—Edward J. Norton

[57] ABSTRACT

The destructive effects of electrical storms in destroying the input stage of a receiver including active devices when coupled to an antenna is minimized by the use of a suitable saturable reactance coupled between the antenna terminals and the first stage of the receiver.

4 Claims, 2 Drawing Figures

INVENTOR
Steven Wlasuk
BY Edward J Norton
ATTORNEY

LIGHTNING PROTECTION SYSTEM

BACKGROUND OF THE INVENTION

This invention relates to the input protection of a receiver, and more particularly to a system for the protection of active devices in a receiver from the destructive effects of electrical charges near the antenna which charges are associated with electrical storms.

In the past, various types of devices such as diodes have been coupled between the antenna and the input stages of a receiver for protection of the active devices in the receiver from the destructive effects of electrical charges associated with electrical storms. These devices generally do not act fast enough to protect the active devices (particularly transistors) from these destructive effects. In some cases the effect of the high currents associated with the near miss of lightning when diode protection circuits are used has either destroyed the input stages or destroyed the protecting diode requiring maintenance.

It is an object of this invention to provide a lightning protection system coupled between the antenna and the active devices of a receiver for protecting the receiver from the destructive effects of electrical charges associated with electrical storms.

SUMMARY OF THE INVENTION

Briefly, the above and other objects of this invention are accomplished by a saturable reactance coupled between the antenna and the active device in the first stage of a radio frequency receiver.

DESCRIPTION OF A PREFERRED EMBODIMENT OF THE INVENTION

Figure 1:
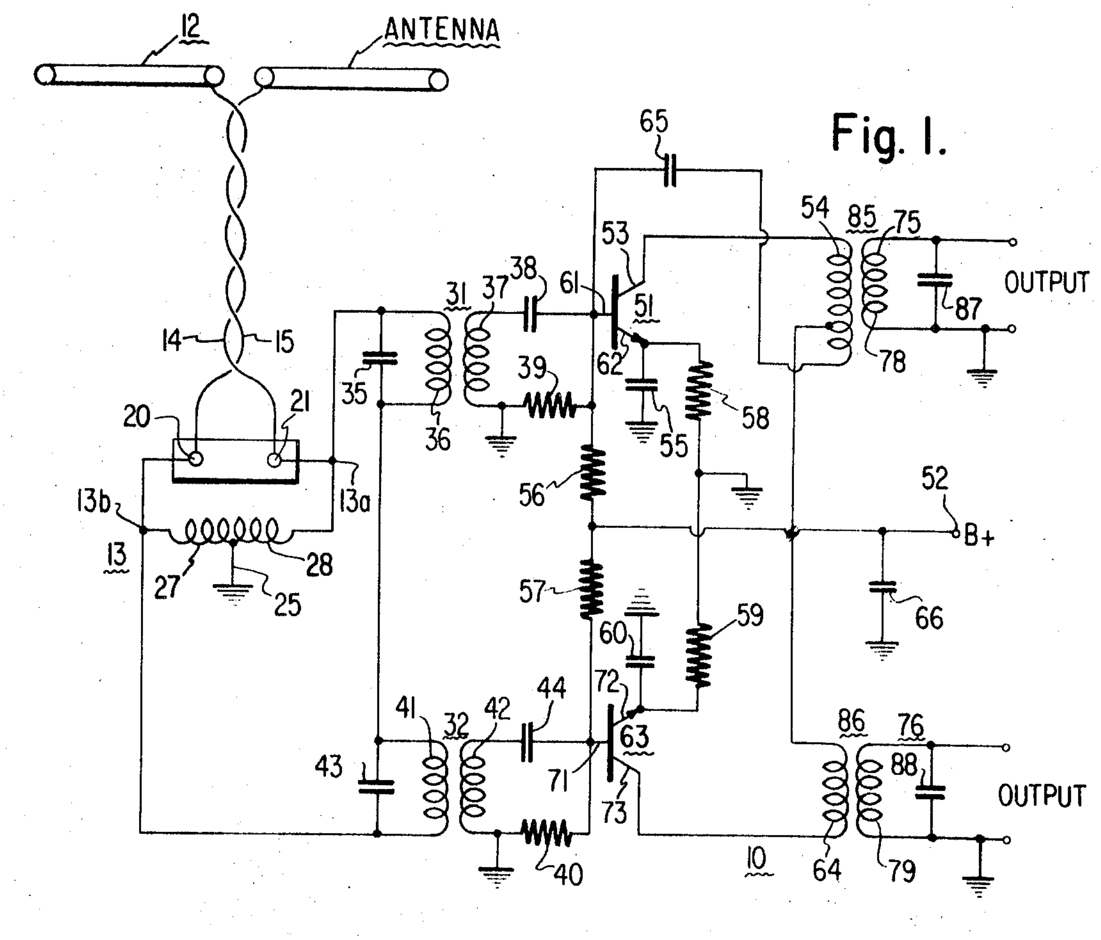
Figure 2:
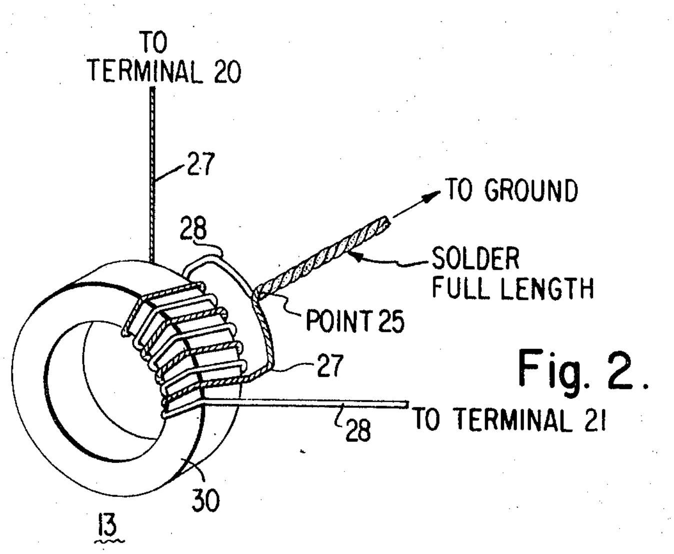

A more detailed description follows in conjunction with the following drawings wherein:

FIG. 1 is a schematic representation of an embodiment of applicant's invention, and FIG. 2 is a perspective view of an autotransformer like that used in FIG. 1.

Referring now to FIG. 1, there is shown an amplifier 10, an antenna 12 and a transformer coupling unit 13 coupled between the antenna and the radio frequency (RF) amplifier 10. Twin lead 14, 15 is coupled at the mid-point of a half wavelength ($\mu/2$) dipole antenna 12 with one of the leads 15 being coupled to terminal 20 and the other lead 14 being coupled to terminal 21 of a one-winding transformer or auto-transformer 13. The mid-point 25 of the auto-transformer 13 is coupled to ground or reference potential. Referring to FIG. 2, there is a sketch of an auto-transformer 13 like that illustrated schematically in FIG. 1. The auto-transformer 13 is constructed, for example, of two No. 26 wires 27,28 which form the coil winding of the transformer 13. The wire 27 indicated by lines across the wire to distinguish from wire 28 is wound in a clockwise direction three times about ferrite toroid 30 and is then twisted to one end of wire 28. The free end of wire 27 is then coupled to terminal 20. Starting from the end of wire 28 which is twisted to wire 27, wire 28 beginning at the same portion of toroid 30 is twisted between the winding of wire 27 in a clockwise direction about the ferrite toroid 30 in the same direction as wire 27. The twisted ends of wires 27,28 are coupled to ground potential at point 25. The free end of wire 28 is coupled to terminal 21. The ferrite toroid 30 is, for example, National Moldite's M4–434. National Moldite sells this material from its location at 260 South Street, Newark, N.J. The ferrite toroid used in the sketched example has an inner diameter of 0.109 inch and an outer diameter of 0.234 inch and a thickness of 0.060 inch. The material, the number of windings and the dimension need not be the same as that described in the example.

The dimension and the material of the toroid 30 and the number of turns of the windings (which may vary from two to ten turns for the arrangement shown) are selected such as to provide a saturable reactance which remains unsaturated in response to normal RF signal levels at the antenna and presents a high reactive impedance to the normal RF signals. In addition the dimensions and the material of the toroid and the number of windings are selected as in the example above so that the toroid saturates rapidly when the signal level at the antenna is a given threshold above normal RF signal level which threshold level is just below the destruction level of the active devices in the receiver.

Transformers 31 and 32 are coupled at opposite phase and equal power level ends of transformer 13 as shown in FIG. 1. Transformer 31 includes a primary coil 36 in parallel with capacitor 35 and a secondary coil 37 in parallel with capacitor 38 and resistor 39. The inductance and capacitance values of inductors 36,37 and capacitors 35,38 are arranged so that the tuned circuits that make up the transformer 31 present high impedance at the high end of the VHF television frequency band (174 to 216 $MH_z$), for example, and present a short circuit to signals to the low VHF television frequency band (54 to 88 $MH_z$). Transformer 32 includes a primary coil 41 in parallel with capacitor 43 and a secondary coil 42 in parallel with capacitor 44 and resistor 40. The inductance and capacitance values of inductors 41,42 and capacitors 43, 44 are arranged so that the primary and secondary tuned circuits of transformer 32 present a high impedance at the low VHF television frequency band and a short circuit impedance at the high VHF television frequency band.

The output of transformers 31 and 32 are coupled across the respective transistor circuit stages 51 and 63. The transistor stages 51 and 63 in the example of FIG. 1 are balanced transistor amplifier circuits. Direct current DC bias for the transistor stages 51 and 63 is provided by B+ voltage at terminal 52 coupled to collectors 53 and 73 through coils 54 and 64. Resistors 56 and 57 coupled between the B+ terminal 52 and the respective bases 61 and 71 of the transistors and resistor 58 and 59 coupled between each of the emitters 62 and 72 and ground potential establish the proper DC bias level for transistors 51, 63. Capacitor 66 coupled across the B+ provides RF bypass of the collector output. Capacitors 55 and 60 provide RF bypass to ground. An extension of coil 54 is RF coupled through capacitor 65 to the base 61 of transistor 51 to provide stability. The output of transformer 31 is coupled between the base 61 and emitter 62 of the transistor 51. The output of transformer 32 is applied between the base 71 and emitter 72 of transistor 63. The outputs of transistors 51 and 63 are shown as transformer coupled to tuned output circuits 75 and 76, respectively. Coils 54 and 78 are the primary and secondary windings respectively of transformer 85, and coils 64 and 79 are the primary and secondary windings respectively of transformer 86. The output tuned circuit 75 includes coil 78 and capacitor 87, and the output tuned circuit 76 includes capacitor 88 and coil 79. The particular amplifier circuit shown is not necessary to the operation of the present invention but is shown only by way of example. The particular circuit and arrangement can be determined according to the needs of the application intended.

In the operation of the arrangement shown in FIG. 1, signals within the high and low VHF television frequency bands are coupled by the center fed dipole antenna 12 to terminals 20,21 of the coupling unit 13 by means of the twin lead wires 14 and 15. Normal level RF signals within the two VHF television frequency bands are coupled across the leads of the auto-transformer 13. Signals within the high VHF television frequency band are coupled through transformer 31 located at end 13a of auto-transformer 13 to the transistor amplifier 51. These signals across transistor 51 are amplifed and coupled out of the amplifier section 10 through transformer 85 and to the input of a television receiver, for example. Signals within the low VHF television frequency band are coupled through transformer 32 connected at the opposite end 13b of auto-transformer 13 to the transistor amplifier stage 51a. The signals across the input of transistor 63 are amplified and are transformer coupled out of the amplifier section 10 through transformer 86 to a television receiver, for example.

As the input current in the coil winding 27,28 increases beyond the normal RF signal levels due to lightning near the antenna, the flux in the toroid 30 increases rapidly. The toroid 30 saturates before the signal level across the transistors 51, 63 is reached at which destruction of the transistors would occur. At saturation of the toroid 30, the impedance across the output of the auto-transformer 13 decreases to approach a short circuit during the period the input signal level is above the normal signal level and thereby provides isolation of the transistors from the high signal or noise levels. In the operation of the above described arrangement the saturable reactance can be located anywhere between the antenna and the first active circuit stage. Also, the first active element stage need not be an amplifier but may be any first active element stage such as a mixer in some cases.

What is claimed is:

1. In combination: a radio frequency amplifying apparatus operated with an antenna, terminals in said apparatus for connection to said antenna, at least one transistor amplifier in said apparatus having a given signal level threshold above which destruction of the transistor amplifier occurs, and means including a saturable reactance device coupled across said terminals for coupling said terminals to said transistor amplifier, said saturable reactance device constructed to decouple said transistor amplifier from said antenna by saturating in the presence of a signal level above said given threshold as when lightning occurs near said antenna.

2. The combination as claimed in claim 1 wherein said saturable reactance is normally unsaturated in response to signals below said given threshold level and is responsive to high level signals above said threshold level to saturate and to thereby decouple said high level signals from said transistor amplifier prior to the destruction of said transistor amplifier thereby.

3. The combination as claimed in claim 2 wherein said saturable reactance is a transformer including windings and a saturable core.

4. The combination as claimed in claim 3 wherein said core is a toroid and the permeability of the toroid material, the dimension of the toroid and the number of turns of the windings about the toroid are selected so that at said below threshold signal levels the toroid causes increased effective inductance in the windings, and when said above threshold signal levels occur, the toroid is rapidly saturated causing rapid decrease in the inductance of the windings.

* * * * *